(12) United States Patent
Sedukhin et al.

(10) Patent No.: US 7,739,690 B2
(45) Date of Patent: Jun. 15, 2010

(54) META-CONTAINER FOR MODEL-BASED DISTRIBUTED APPLICATIONS

(75) Inventors: Igor Sedukhin, Issaquah, WA (US); Dan Eshner, Issaquah, WA (US); Stephen T. Swartz, Seattle, WA (US); Oliver Sharp, Sammamish, WA (US); Uday Kumar Bhaskara, Redmond, WA (US); Nagalinga Durga Prasad Sripathi Panditharadhya, Sammamish, WA (US); Amol Sudhakar Kulkarni, Bothell, WA (US); Girish Mittur Venkataramanappa, Redmond, WA (US); Vladimir Pogrebinsky, Sammamish, WA (US); Haoran Andy Wu, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 11/740,579

(22) Filed: Apr. 26, 2007

(65) Prior Publication Data
US 2008/0270585 A1 Oct. 30, 2008

(51) Int. Cl.
*G06F 13/00* (2006.01)
(52) U.S. Cl. ......................... 719/318; 719/321; 719/327
(58) Field of Classification Search .................. 719/318, 719/321, 327
See application file for complete search history.

(56) References Cited

U.S. PATENT DOCUMENTS

| | | | |
|---|---|---|---|
| 6,356,915 B1 * | 3/2002 | Chtchetkine et al. ............... | 1/1 |
| 6,621,505 B1 | 9/2003 | Beauchamp et al. | |
| 6,721,615 B2 | 4/2004 | Fava et al. | |
| 6,766,477 B2 | 7/2004 | Grucci et al. | |
| 6,999,956 B2 | 2/2006 | Mullins | |
| 7,162,722 B1 | 1/2007 | Supinski et al. | |
| 7,197,553 B2 | 3/2007 | Roberts et al. | |
| 2004/0044494 A1 * | 3/2004 | Muller et al. ............... | 702/123 |
| 2004/0162741 A1 | 8/2004 | Flaxer et al. | |
| 2005/0050311 A1 | 3/2005 | Joseph et al. | |
| 2005/0060722 A1 | 3/2005 | Rochette et al. | |
| 2005/0160135 A1 | 7/2005 | Yokoro | |
| 2005/0216922 A1 | 9/2005 | Mogilevsky et al. | |
| 2005/0222968 A1 | 10/2005 | Wayman | |
| 2006/0009954 A1 | 1/2006 | Bishop et al. | |
| 2006/0143193 A1 | 6/2006 | Thakkar et al. | |

(Continued)

FOREIGN PATENT DOCUMENTS

WO  0124003 A1  4/2001

OTHER PUBLICATIONS

Unknown, "Towards SOA and ESB," An Anshinsoft Whitepaper, printed on Feb. 26, 2007, 8 pages, Ashinsoft Corporation, USA.

(Continued)

*Primary Examiner*—Andy Ho
(74) *Attorney, Agent, or Firm*—Senniger Powers LLP (57) ABSTRACT

Abstracting communication with a plurality of containers. Each container encapsulates or hosts a module (e.g., a web service, a database, etc.) associated with a distributed application. A meta-container communicates with drivers that interface with each of the containers. The meta-container represents an abstraction and a virtualization of the containers in the hierarchy. Each container may also be a meta-container for other containers. The recursion and layered hierarchy provide flexible, extensible, and efficient management of the distributed application.

20 Claims, 5 Drawing Sheets

U.S. PATENT DOCUMENTS

2006/0156296 A1  7/2006  Goldberg

OTHER PUBLICATIONS

Shankland, "Linux Heavies Plan Lightweight Virtualization,", 4 pages, Aug. 2006, CNET News.com, USA.

Hynes, "Oracle Containers for J2EE," Developer's Guide, 10g Release 2 (10.1.3), Jul. 2005, 136 pages, Oracle, USA.

Barcia et al., "IBM WebSphere Developer Technical Journal: Building SOA Solutions with the Service Component Architecture—Part 1," Oct. 2005, 56 pages, IBM Corp., USA.

Unknown, "BEA AquaLogic Product Family," BEA White Paper, Jun. 2005, 20 pages, BEA Systems, Inc., USA.

Unknown, "SAP NetWeaver," 2004, 8 pages, SAP AG, USA.

Stearns et al., "Update: An Introduction to the Java EE 5 Platform," White Paper, May 2006, 17 pages, Sun Microsystems, Inc., USA.

Demarest et al., "Oracle Fusion Architecture and Oracle Fusion Applications," White Paper, Jan. 2006, 47 pages, Oracle Corporation, USA.

Perkins, A., "Business Rules=Meta-Data," Proceedings of the Technology of Object-Oriented Languages and Systems (TOOLS 34'00), 2000, pp. 285-294.

* cited by examiner

META-CONTAINER FOR MODEL-BASED DISTRIBUTED APPLICATIONS

BACKGROUND

Many applications are network-centric. The value in such applications is collaboration enabled by software. Achieving such collaboration through programming and running network applications is challenging. It requires understanding and managing individually all of the diverse, interrelated, distributed pieces that comprise a network application. The distributed elements include, for example, web sites, databases, workflows, web services, electronic data information exchanges, etc. Each of the distributed elements is generally hosted or managed by numerous hosting services and service control managers that are specific to the particular distributed element. Running each of the different hosting services with different distributed elements in them is complex and costly.

Some existing systems use the concept of a container to abstract the operation of a single, atomic module of a distributed application. Other existing systems use a container to abstract the operation of a composite, non-distributed application. However, such existing systems do not aid in the overall management of diverse elements in a heterogeneous distributed application. For example, the existing systems fail to provide an abstraction or interface between the container and some external management system to configure and coordinate execution of distributed applications.

SUMMARY

Embodiments of the invention include a meta-container communicating with a plurality of drivers each associated with a container hosting one or more modules of a distributed application program. The drivers transmit commands to the associated containers and transmit events from the associated containers. The applications are described in a model repository that is accessed to identify the appropriate containers and drivers associated with the module adapted to process the command.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
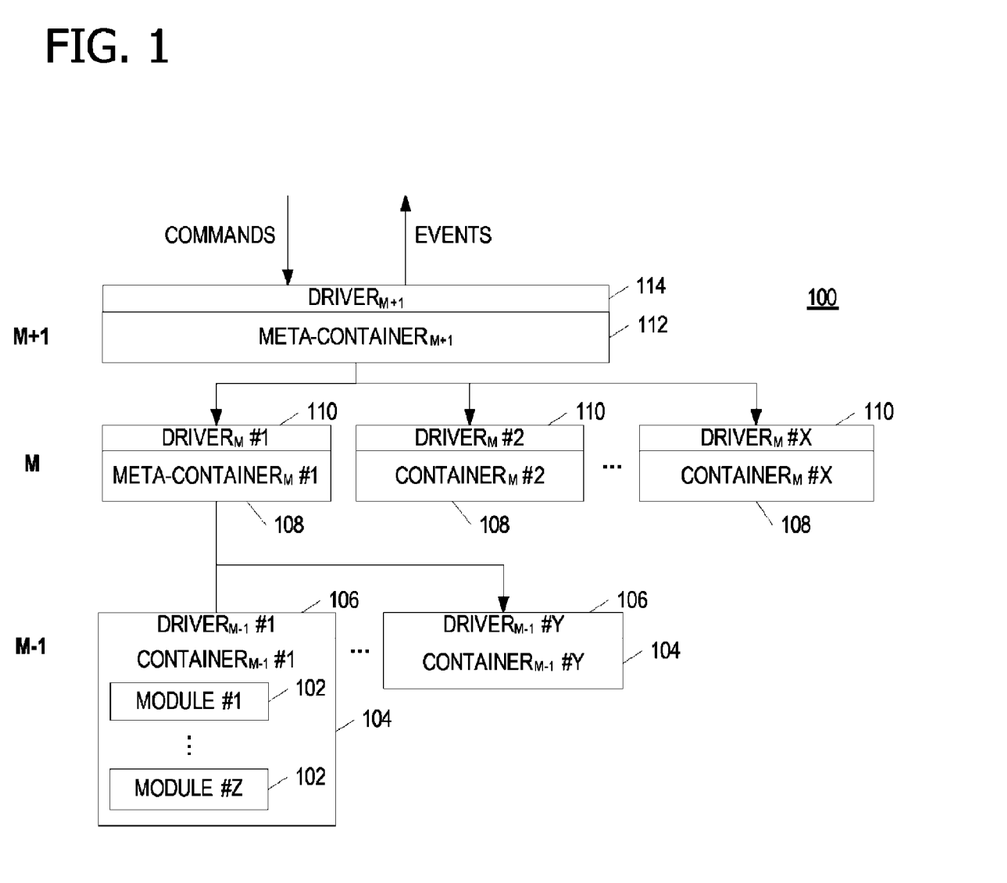
FIG. 1 is an exemplary block diagram illustrating the hierarchical organization of containers and meta-containers for distributed applications.

In an embodiment, the invention manages distributed applications via abstraction and virtualization of the operation of elements of the distributed application. In particular, the invention includes a hierarchical organization of containers such as shown in FIG. 1. Virtualization raises the level of abstraction and represents many diverse things as one coherent unit to simplify management. For example, an operating system enables interactions with a computer as a unit of many components and devices. Without the operating system, dealing with each individual component or device in a computer would subject the user to a chaotic mess of unmanaged, individual, intricately inter-related components. The principle of virtualization applied to distributed applications radically improves the experience in programming, operating and administering network-centric applications.

Referring again to FIG. 1, each of a plurality of containers hosts one or more modules associated with an application program. Each of the plurality of containers supports runtime execution of the associated modules. Each of a plurality of drivers is associated with one of the defined plurality of containers. Each of the defined plurality of drivers transmits commands to the associated container and transmits events from the associated container. In general, the drivers abstract the implementation of the associated containers. A meta-container interfaces with each of the plurality of defined containers via the corresponding defined plurality of drivers. In general, each container may be a meta-container abstracting a plurality of containers in a lower level of the hierarchy.

Containers are responsible for the lifecycle of the associated module (e.g., starting, stopping, and managing any other operations of the module). The lifecycle operations are container- or module-specific, and provided by the container or module. The container hosts, activates, encapsulates, or otherwise manages the logic and data of the module. Containers enable separation and isolation of particular application modules while promoting and generalizing aspects common to the modules. For example, the container is a technology-specific activation service or host (e.g., for hosting web sites, web services, databases, etc.).

Drivers abstract technology and implementation-specifics to represent diverse containers in a common way. Each driver is particular to its associated container. Each driver includes a programmatic interface such as an application programming interface for scripts, user interaction, etc. The programmatic interface is common across drivers. Each driver abstracts the corresponding container into a set of operations accessible to components in a higher level of the hierarchy. This abstraction is used by the meta-container on the next higher level to manipulate the module(s) hosted by the container. Each of the plurality of drivers unifies run-time management of the associated container and hosted modules by abstracting the container into a set of operations available for execution by the meta-container.

Each driver expects communications from the next higher meta-container using a lifecycle management protocol or other state machine protocol. The protocol represents features of the container, events, and basic lifecycle management of hosted modules. The protocol controls a state of the hosted module.

Each meta-container represents a plurality of diverse, technology-specific containers as a single, unified container. The meta-container is largely technology-agnostic. A meta-container such as meta-container 112 is responsible for the lifecycle of the entire application represented by the model depicted in FIG. 3. Each container may be a meta-container if it abstracts one or more containers in a next lower level of the hierarchy such as shown in FIG. 1.

In FIG. 1, there are X containers 108 in layer M (where X and M are positive integers) such as container #1 through container #X. In layer M+1, the containers 108 from layer M are unified, controlled, and represented by the single meta-container 112. While managing all of the containers 108 may be complex and expensive, managing the meta-container 112 is simpler and less expensive thus enabling the design and management of larger and more capable distributed applications. In layer M−1, there are Y containers 104 (where Y is a positive integer) such as container #1 through container #Y. Container #1 104 has a plurality of modules 102 such as module #1 through module #Z where Z is a positive integer.

Each of the containers 104, 108, 112 has a driver 106, 110, 114, respectively, for interfacing with the respective containers. Layer M−1 has drivers 106 such as driver #1 through driver #Y. Layer M has drivers 110 such as driver #1 through driver #X. Layer M+1 has a driver 114. In layer M−1, the drivers 106 abstract the notion of individual containers 104 and represent them in a uniform, standard interface used by the meta-container #1 108 to interact with the containers 104. The meta-container #1 108 may be thought of as a meta-container over worker process containers (e.g., containers 104). Meta-container 112 in layer M+1 also has a driver 114 for interfacing with other higher-level entities.

As illustrated by the hierarchy in FIG. 1, aspects of the invention are extensible and recursive. Embodiments of the invention enable the development and processing of hierarchical systems of application containers where each upper-layer enables larger, more complex applications to be composed, executed and managed simpler and cheaper.

Figure 2:
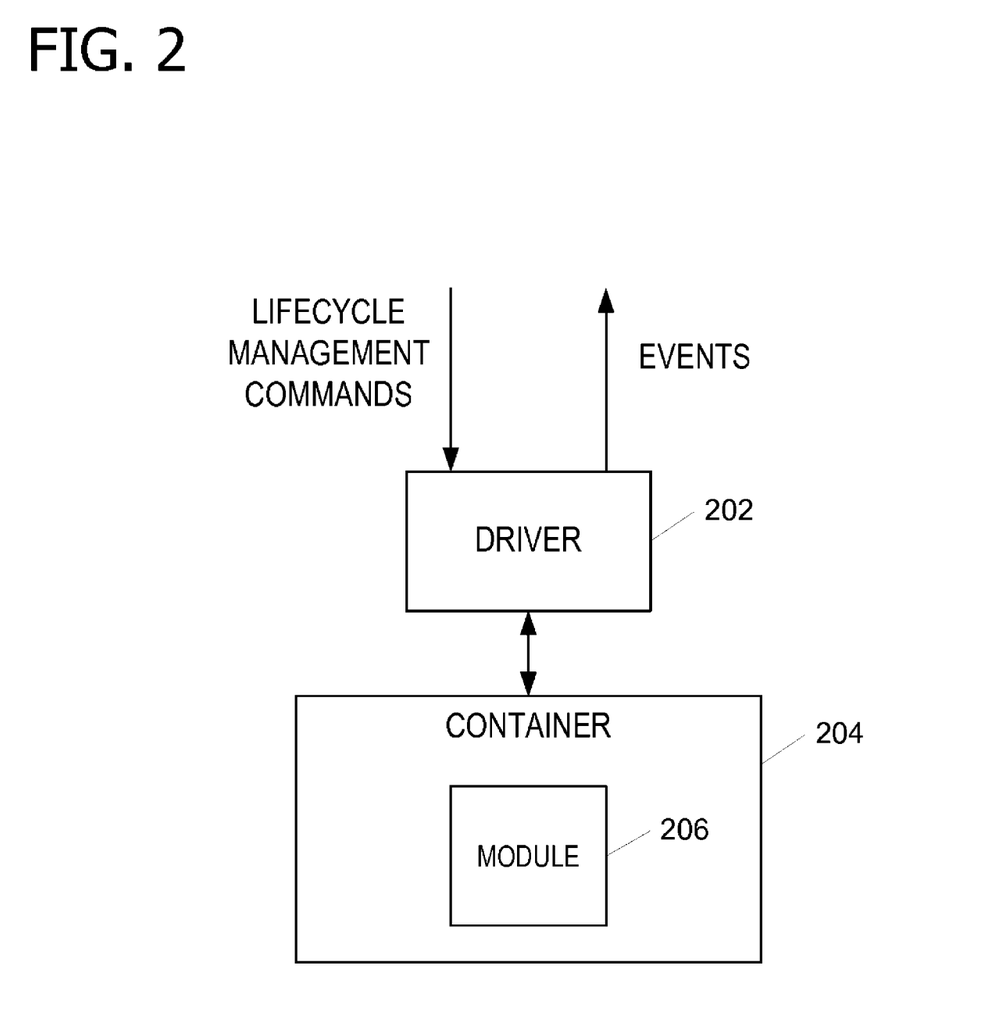
FIG. 2 is an exemplary block diagram illustrating the receipt of commands by a container and the return of events.

Referring next to FIG. 2, an exemplary block diagram illustrates the receipt of commands by a container and the emitting of events. A driver 202 receives lifecycle management commands with respect to a module from, for example, another application program or a user and provides them to the container 204 that is associated with the driver 202. The container 204 abstracts operation of a module 206. The command is processed by the container 204 using the knowledge of the model of the module 206 such as, for instance, a model of a WORKFLOW module of a distributed application in FIG. 3. Output from the processing and information about runtime behavior of the module are communicated from the container 204 to the driver 202 to the entity (e.g., other application program or a user) that requested the processing or to other entities in the form of events. Events are data records about real-world occurrences such as module started, stopped or its operation failed.

Figure 3:
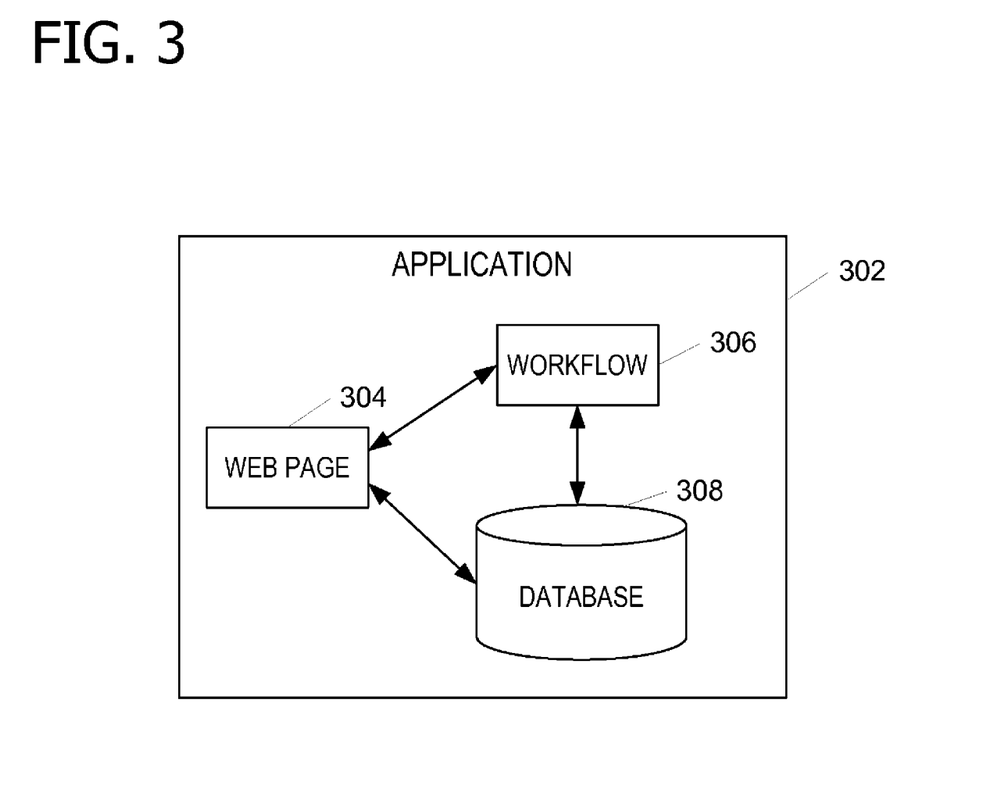
FIG. 3 is an exemplary block diagram illustrating a model of a distributed application.

Referring next to FIG. 3, an exemplary block diagram illustrates a model of a distributed application 302. In general, a distributed application such as application 302 has a workflow 306 describing the logic and data associated with the application 302. The application 302 may include other distributed components including, for example, a web page 304 or web service. The application 302 includes or has access to a database 308 (e.g., a structured query language database) storing data for use by the application 302.

In operation, a driver such as driver 202 in FIG. 2 receives commands or verbs along with a reference to a particular model of an application module. The particular model is fetched from a model repository (see repository 410 in FIG. 4) and the command is performed on the fetched model by routing the command to the driver associated with the container hosting the module. The driver adapts the container to process the command and the referred to model of the module. In general, the driver translates intent (e.g., commands and models) into imperative actions on containers hosting the module.

New models may be defined by providing the new models (e.g., received from a user) to the model repository.

Figure 4:
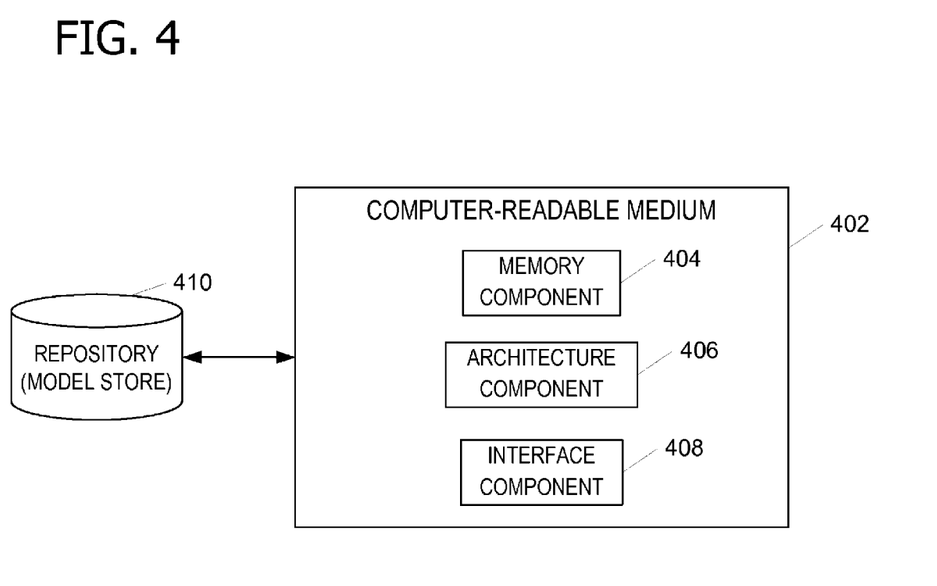
FIG. 4 is an exemplary block diagram illustrating a computer-readable medium storing computer-executable components for implementing aspects of the invention.

Referring next to FIG. 4, an exemplary block diagram illustrates a computer-readable medium 402 storing computer-executable components for implementing aspects of the invention. The computer-executable components manage distributed applications and comprise, for example, a memory component 404, an architecture component 406, and an interface component 408. The memory component 404 stores one or more models in a repository 410. Each of the models describes an application program. The architecture component 406 defines a plurality of containers each for hosting modules associated with an application program. The architecture component 406 also defines a plurality of drivers each associated with one of the defined plurality of containers. Each of the defined plurality of drivers transmits commands to the associated container and transmits events from the associated container. The architecture component 406 also defines a meta-container for interfacing with each of the plurality of defined containers via the corresponding defined plurality of drivers. The interface component 408 receives a command, accesses the models stored in the memory component to identify one of the defined plurality of containers adapted to process the received command, and provides the received command to the driver associated with the identified one of the defined plurality of containers. The driver communicates with the associated container to execute the received command.

In an embodiment, some or all of the memory component 404, the architecture component 406, and the interface component 408 are executed by a computing device associated with a meta-container in the hierarchy (e.g., meta-container 112 in FIG. 1). In other embodiments, any computing device executes the computer-executable components.

In an embodiment, the interface component 408 further receives a user-defined model for storage in the repository 410 by the memory component 404. In this manner, the distributed application may be modified or an additional application supported.

Figure 5:
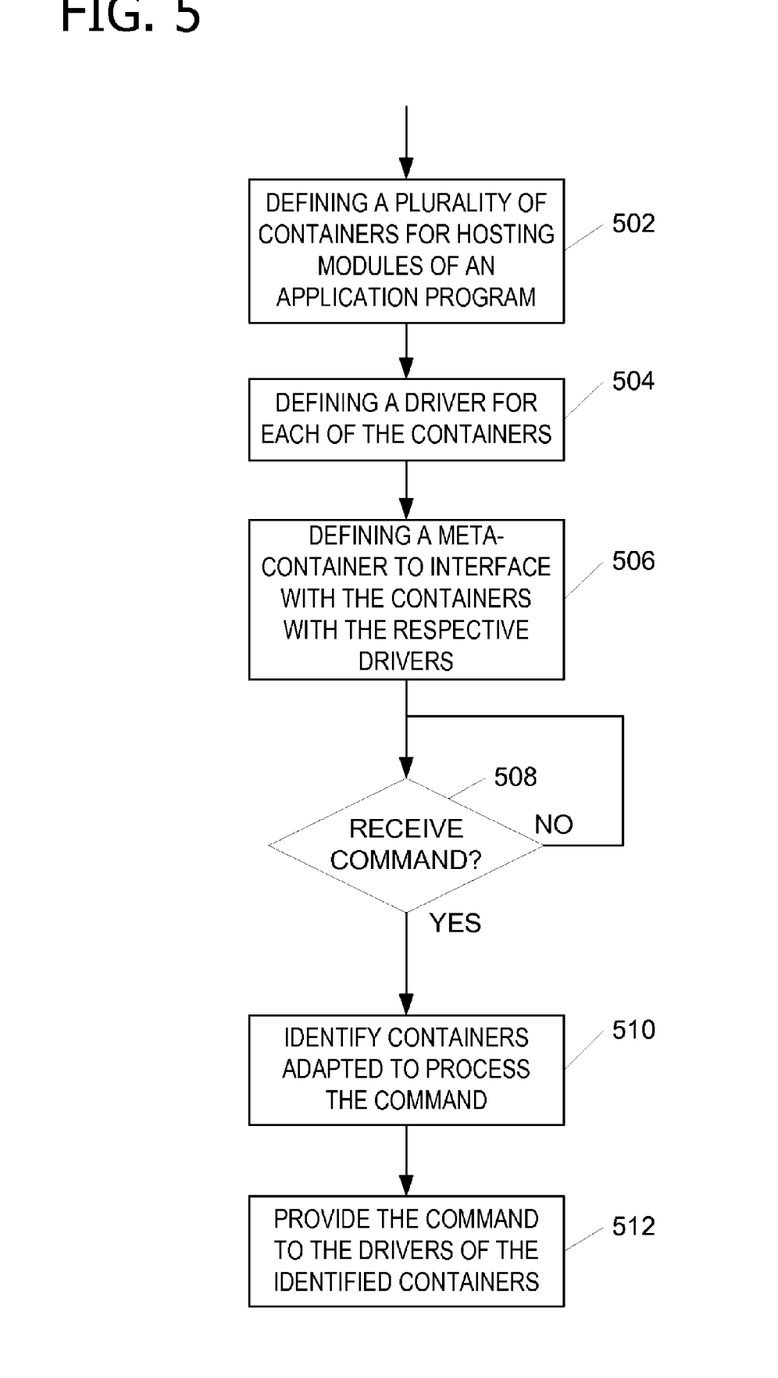
FIG. 5 is an exemplary flow chart illustrating operation of aspects of the invention.

Referring next to FIG. 5, an exemplary flow chart illustrates operation of aspects of the invention. The operations in FIG. 5 represent an exemplary method for managing distributed applications according to the invention. Other methods, including more, fewer, or other operations, are within the scope of embodiments of the invention.

In FIG. 5, a plurality of containers is defined at 502. Each of the defined containers hosts one or more modules associated with an application program. A driver for each of the containers is defined at 504. Each of the drivers transmits commands to the associated container and transmits events from the associated container. A meta-container interfacing with the containers via the respective drivers is defined at 506.

If a command is received at 508 (e.g., by the top-level meta-container), logic associated with the meta-container fetches a model of the application and identifies one or more containers that are adapted to process the command at 510. The command is provided to the identified containers at 512 and the identified containers then process the command with respect to the modules associated with the identified containers.

For example, the meta-container may identify only the containers at the next lower level in the hierarchy that should process the command. Each identified container in this level then determines which, if any, of the next lower containers should receive the command. This recursive process continues down through the hierarchy until the appropriate container has been identified and has processed the command.

The operation of the embodiment in FIG. 5 may be implemented by computer-executable instructions organized into one or more computer-executable components stored on one or more computer-readable media. Embodiments of the invention include a processor (not shown) configured to execute the computer-executable instructions. Upon execution, the computer-executable instructions implement aspects of the invention. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

Aspects of the invention may be implemented with a general purpose computing device in the form of a computer. Generally, the data processors of the computer are programmed by means of instructions stored at different times in the various computer-readable storage media of the computer. Embodiments of the invention may be described and implemented in the general context of computer-executable instructions, such as program modules, executed by one or more computers or other devices. The computing device has access to or is associated with a computer-readable media storing, for example, models of distributed applications. Computer readable media, which include both volatile and nonvolatile media, removable and non-removable media, may be any available medium that may be accessed by the service. By way of example and not limitation, computer readable media comprise computer storage media and communication media. Computer storage media include volatile and nonvolatile, removable and non-removable media implemented in any method or technology for storage of information such as computer readable instructions, data structures, program modules or other data. For example, computer storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information and that may be accessed by the computing device. Communication media typically embody computer readable instructions, data structures, program modules, or other data in a modulated data signal such as a carrier wave or other transport mechanism and include any information delivery media. Those skilled in the art are familiar with the modulated data signal, which has one or more of its characteristics set or changed in such a manner as to encode information in the signal. Wired media, such as a wired network or direct-wired connection, and wireless media, such as acoustic, RF, infrared, and other wireless media, are examples of communication media. Combinations of any of the above are also included within the scope of computer readable media.

The computer-executable instructions and components described herein constitute exemplary means for representing the plurality of containers as a single container and means for managing the lifecycle and behavior of distributed applications.

Although described in connection with an exemplary computing system environment, embodiments of the invention are operational with numerous other general purpose or special purpose computing system environments or configurations. The computing system environment is not intended to suggest any limitation as to the scope of use or functionality of any aspect of the invention. Moreover, the computing system environment should not be interpreted as having any dependency or requirement relating to any one or combination of components illustrated in the exemplary operating environment. Examples of well known computing systems, environments, and/or configurations that may be suitable for use with aspects of the invention include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

In operation, a computer executes computer-executable instructions such as those illustrated in the figures and described herein to implement aspects of the invention.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A computer system having at least one processor for managing distributed applications, said system comprising:
   a plurality of containers each for hosting one or more modules associated with an application program, wherein each of the plurality of containers supports runtime execution of the associated module;
   a plurality of drivers each associated with one of the defined plurality of containers, each of the defined plurality of drivers transmitting commands to the associated container and transmitting events from the associated container, wherein each of the defined plurality of drivers abstracts implementation of the associated container; and
   a meta-container for interfacing with each of the plurality of defined containers via the corresponding defined plurality of drivers, wherein the meta-container receives a command associated with one of the modules and provides the received command to one of the plurality of drivers associated with one of the plurality of containers adapted to process the command with reference to said one of the modules.

2. The system of claim 1, further comprising a meta-container driver, wherein the meta-container represents the plurality of defined containers as a single container to the meta-container driver.

3. The system of claim 1, wherein each of the plurality of drivers abstracts the implementation of the associated container.

4. The system of claim 1, wherein each of the plurality of containers hosts logic and data associated with the modules.

5. The system of claim 1, further comprising a model repository for describing the modules associated with the application program.

6. The system of claim 5, wherein the meta-container receives the command from a user.

7. The system of claim 1, further comprising means for representing the plurality of containers as a single container.

8. The system of claim 1, further comprising means for managing the lifecycle and behavior of distributed applications.

9. The system of claim 1, further comprising a memory area for storing a model describing the application program.

10. The system of claim 1, wherein each of the plurality of drivers unifies run-time management of the associated container by abstracting the container into a set of operations available for execution by the meta-container.

11. The system of claim 1, wherein each of the plurality of drivers comprises an application programming interface for the associated container.

12. The system of claim 1, wherein each of the plurality of containers implements a lifecycle management protocol for controlling a state of the hosted module.

13. A computer-implemented method for managing distributed applications, said method comprising:

defining a plurality of containers each for hosting modules associated with an application program;

defining a plurality of drivers each associated with one of the defined plurality of containers, each of the defined plurality of drivers transmitting commands to the associated container and transmitting events from the associated container, wherein each of the defined plurality of drivers abstracts implementation of the associated container;

defining a meta-container for interfacing with each of the plurality of defined containers via the corresponding defined plurality of drivers;

receiving, by the defined meta-container, a command;

identifying one or more of the defined plurality of containers adapted to process the received command; and     providing the received command to the drivers associated with the identified one or more of the defined plurality of containers, wherein the drivers communicate with the associated containers to execute the received command.

14. The method of claim 13, wherein receiving the command comprises receiving one of the following: a command to start execution of one of the modules, and a command to stop execution of one of the modules.

15. The method of claim 13, further comprising accessing a memory area storing a description of the application program to identify the one or more of the defined plurality of containers adapted to process the received command.

16. The method of claim 15, further comprising receiving a modification to the description of the application program and updating the stored description of the application program responsive to said receiving the modification.

17. The method of claim 13, wherein one or more computer-readable storage media have computer-executable instructions for performing the method recited in claim 1.

18. One or more computer-readable storage media storing computer-executable components for managing distributed applications, said components comprising:

a memory component for storing a repository of models, each of the models describing an application program;

an architecture component for:

defining a plurality of containers each for hosting modules associated with the application program;

defining a plurality of drivers each associated with one of the defined plurality of containers, each of the defined plurality of drivers transmitting commands to the associated container and transmitting events from the associated container; and         defining a meta-container for interfacing with each of the plurality of defined containers via the corresponding defined plurality of drivers; and     an interface component for:

receiving, by the defined meta-container, a command;

accessing the models stored in the memory component to identify one of the defined plurality of containers adapted to process the received command; and         providing the received command to the driver associated with the identified one of the defined plurality of containers, wherein the driver communicates with the associated container to execute the received command.

19. The computer-readable storage media of claim 18, wherein the interface component further receives a user-defined model, and wherein the memory component stores the user-defined model in the repository.

20. The computer-readable storage media of claim 19, wherein the user-defined model represents a model of another application program.

\* \* \* \* \*